Aug. 27, 1968  R. SCHAYES ETAL  3,399,301
THERMOLUMINESCENT DOSIMETER FOR DETECTING RADIATION
HAVING A PLURALITY OF COMPONENTS
Filed Jan. 26, 1966
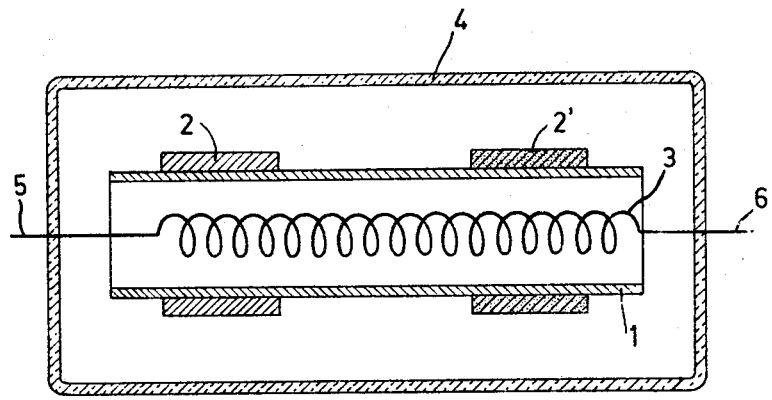
INVENTORS
RAYMOND SCHAYES
ISIDORE KOZLOWITZ
BY
AGENT United States Patent Office 3,399,301
Patented Aug. 27, 1968

3,399,301
THERMOLUMINESCENT DOSIMETER FOR DETECTING RADIATION HAVING A PLURALITY OF COMPONENTS
Raymond Schayes and Isidore Kozlowitz, Brussels, Belgium, assignors to Societe Anonyme, Manufacture Belge Lampes et de Materiel Electronique, Brussels, Belgium
Filed Jan. 26, 1966, Ser. No. 523,107
Claims priority, application Belgium, Jan. 29, 1965, 8,416
3 Claims. (Cl. 250—71)

ABSTRACT OF THE DISCLOSURE

A thermoluminescent dosimeter employing two or more active elements mounted within a common envelope, each of the active elements being responsive to a particular form of radiation so that radiation having two or more components can be detected. A common heating element serves to heat the active elements simultaneously so that all radiation components can be detected simultaneously.

---

The invention relates to a thermoluminescent dosimeter for the measurement of radiation.

Dosimeters of the type to which the invention relates are used for various types of radiation and employ an active substance which is provided on a support. After the irradiation of the substance the temperature is gradually raised which generally is effected by heating the support. At a sufficiently high temperature the substance shows luminescence, this being a measure of the dose of radiation absorbed. The measured result may relate to the amplitude of a thermoluminescent peak which appears in the case of a progressive heating or to the integrated luminescence. These phenomena are known and for their study and for the description of known measuring cells reference may be made to the literature.

A dosimeter for a given type of radiation, for example, gamma rays, is unfit for complex radiation, which contains, for example, gamma rays and neutrons. The active substance which is sensitive to one of the said radiations is not at all, or at least not to the same extent, sensitive to the other radiation. To mitigate this drawback two or more individual dosimeters may be used which, however, entails several drawbacks. The object of the use of a dosimeter is to safeguard persons against too large a dose of rays and to obtain the best possible measuring results. The latter of these conditions is fulfilled by the use of several individual and individually chosen apparatus which are correctively subjected to the complex radiation to be investigated. However, arranging two measuring cells beside one another as such entails the drawback that in spite of particular precautions it is not ensured that the two devices are subjected to the same radiation under the same conditions.

It is the object of the invention to mitigate the above drawbacks. According to the invention, a thermoluminescent dosimeter which meets the above requirements comprises at least two composing parts arranged in the same space, each part consisting of an active substance and a support, of which parts the support can be heated. The active substances of the two parts differ from one another in that each substance is particularly sensitive to a particular type of radiation. The two parts may have a common support or may be provided with a heating element which is common for the two parts.

The invention will be described with reference to the accompanying drawing which shows an embodiment of a dosimeter according to the invention, which is suitable for the investigation of complex radiation which contains gamma radiation and a radiation constituted by neutrons.

The drawing is a longitudinal cross-sectional view of such a dosimeter. On a tubular support 1 made of metal two surface layers 2 and 2' are arranged which consist of different luminescent substances. The support 1 comprises a helically wound filament 3. These parts are arranged in an evacuated jacket 4. The substance 2, for example, is calcium fluoride sensitive gamma rays and the substance 2' is lithium fluoride sensitive to neutrons. Under the influence of a complex radiation the internal structure of the two layers of material 2 and 2' are each varied by the radiation received according to their properties.

For indicating the information received the ends 5 and 6 of the wire 3 are connected to the poles of a voltage source and the wire is heated as a result of the electric current. The developed heat is transferred to the substances 2 and 2' and the luminescence resulting from the said substances is measured to determine the corresponding quantity of radiation they have received.

Of course it is also possible to extend the number of surface layers of sensitive material arranged beside one another dependent upon the composition of the radiation which is to be studied.

What is claimed is:
1. A thermoluminescent dosimeter for investigating radiation having a plurality of components of different characteristics comprising an envelope transparent to the radiation, a support within the envelope, a plurality of thermoluminescent elements mounted on said support, each of said elements being responsive to one of said components of said radiation, and means to heat said elements whereby said elements luminesce and a simultaneous indication of said radiation components is obtained.
2. A thermoluminescent dosimeter as claimed in claim 1 in which said elements are mounted on a tubular support and said heating means is a filament.
3. A thermoluminescent dosimeter as claimed in claim 2, in which one of said elements is calcium fluoride for detecting gamma radiation and the other element is lithium fluoride for detecting neutrons.

References Cited

UNITED STATES PATENTS 2,616,051 10/1952 Daniels _____ 250—71
3,115,578 12/1963 Schulman _____ 250—71
3,255,350 6/1966 Fix _____ 250—83

ARCHIE R. BORCHELT, *Primary Examiner.*